United States Patent Office 3,168,604
Patented Feb. 2, 1965

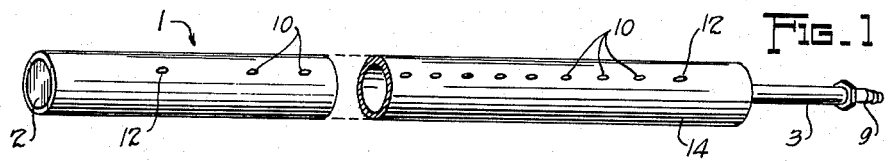
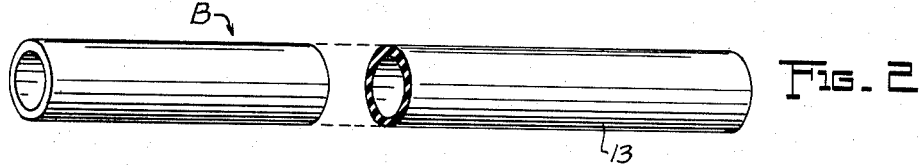
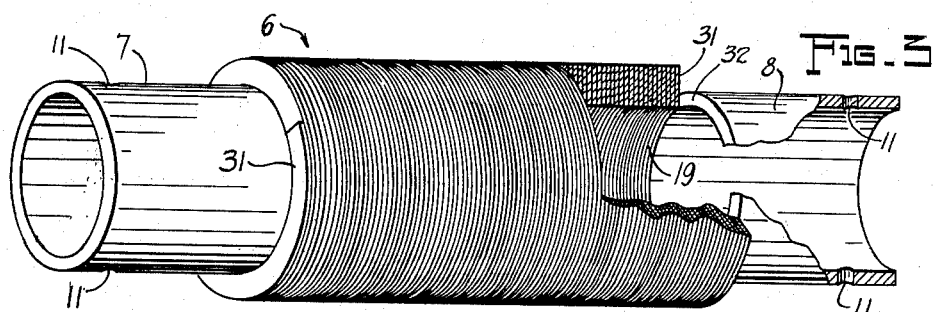
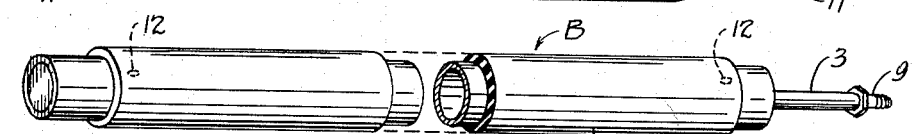
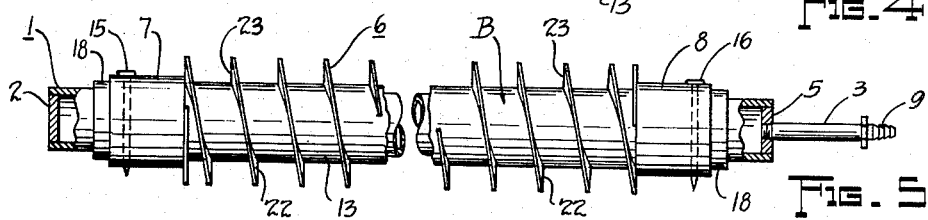
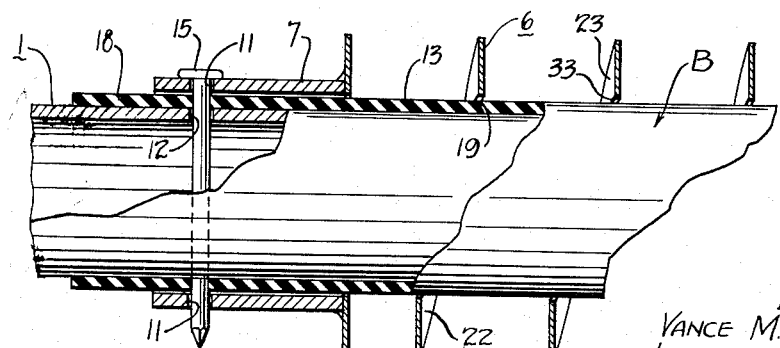
INVENTOR.
VANCE M. KRAMER
LAWRENCE W. CARLTON
BY Bosworth, Sessions,
Herrstrom and Knowles.
ATTORNEYS.

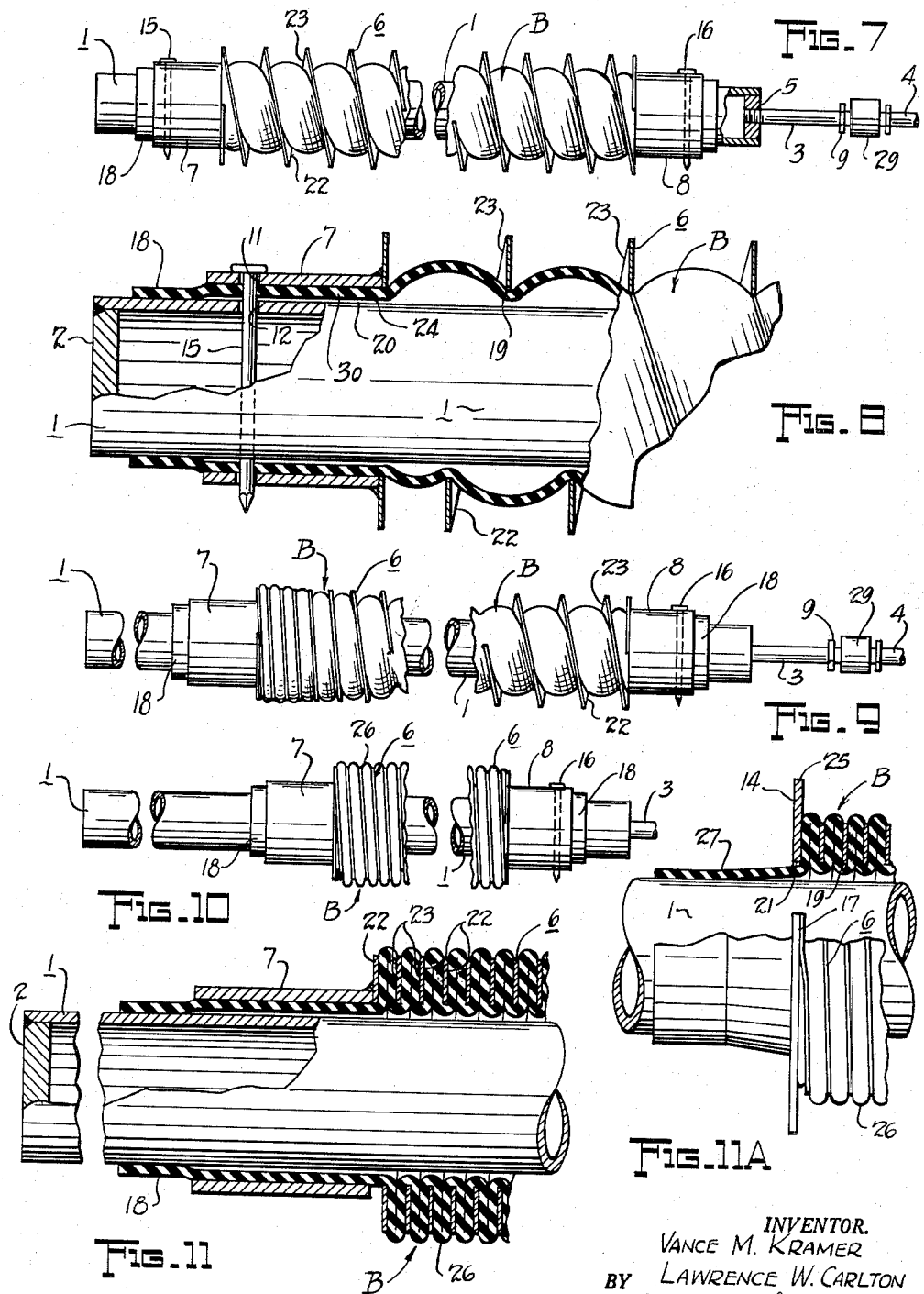

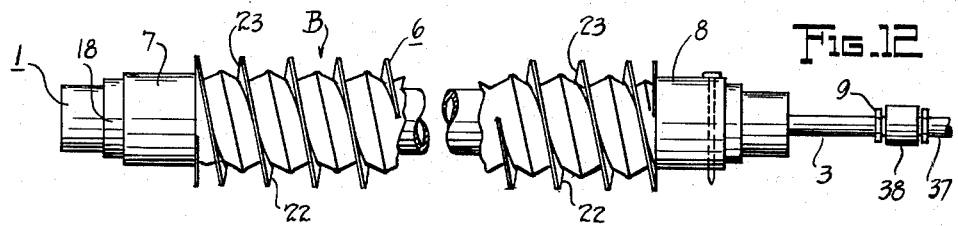
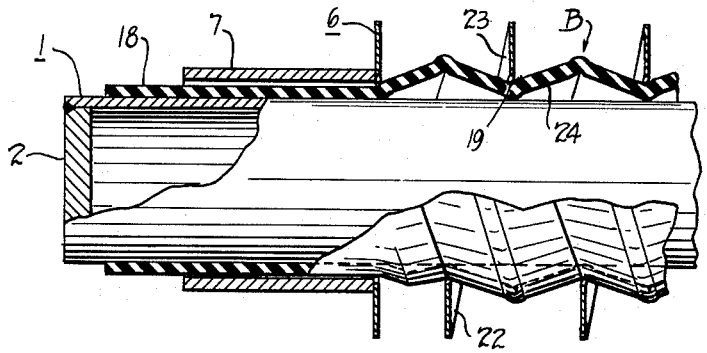
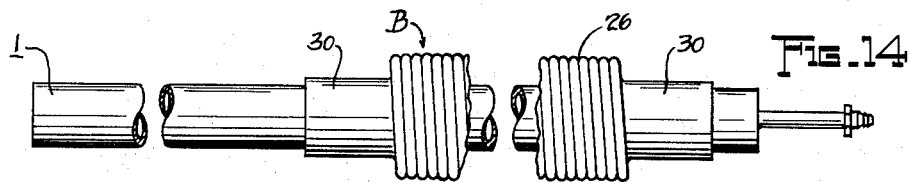
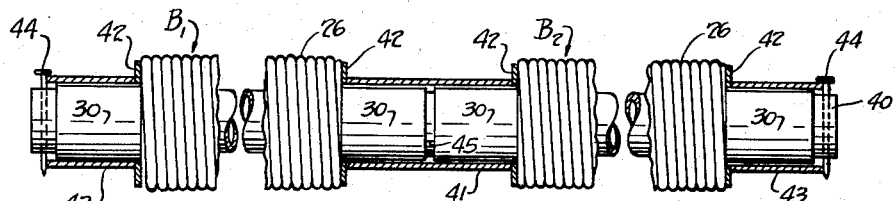
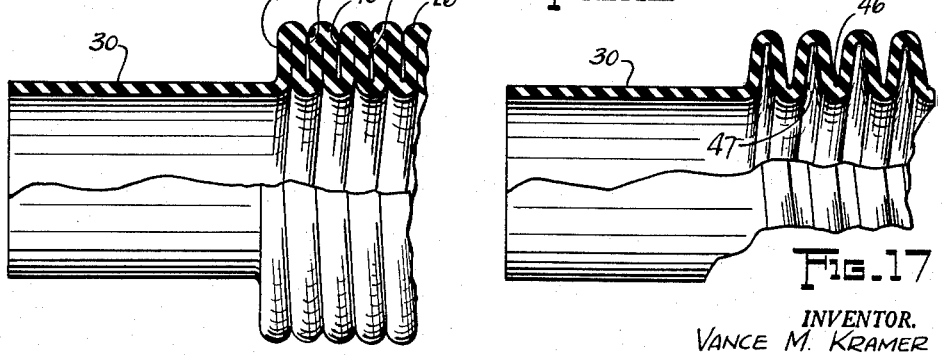
INVENTOR.
VANCE M. KRAMER
LAWRENCE W. CARLTON

3,168,604
PROCESS OF AND APPARATUS FOR MAKING
SPIRALLY CORRUGATED RUBBER TUBING
USING AXIALLY EXTENSIBLE HELIX
Vance M. Kramer, Perrysburg, and Lawrence W. Carlton,
North Baltimore, Ohio (both % Crushproof Tubing
Co., McComb, Ohio)
Filed Nov. 22, 1960, Ser. No. 71,077
8 Claims. (Cl. 264—100)

This invention relates to the manufacture of flexible corrugated rubber tubing. The invention contemplates a new and improved process and apparatus for economically manufacturing such tubing, the tubing so made being characterized by uniformity in wall thickness, increased flexibility and, when and if desired, a high degree of extensibility.

The principal object of the invention is to provide an economical process employing simple, inexpensive apparatus for making such tubing quickly and easily with minimum effort and without need for extensive training of or experience by the person or persons doing the job. The invention contemplates particularly the manufacture of improved spirally corrugated flexible rubber tubing in which adjacent convolutions of the spiral ridge are closely spaced in the unstressed condition of the tubing, have surfaces contacting or closely confronting one another in generally parallel relation.

A more specialized object is to provide a process and apparatus for making spirally corrugated longitudinally extensible rubber tubing which permits the operator readily to vary either the pitch or the radial depth or both the pitch and the depth of the convolutions, so as to meet the requirements of different users, while maintaining uniformity in such pitch and depth in any desired run of production.

Another object is to provide such a process and apparatus adapted for rapid, economical and large scale commercial production of corrugated rubber tubes of different lengths, different inside and outside diameters and different wall thicknesses.

Another object is to provide such a process and apparatus for making spirally corrugated rubber tubing having integral cylindrically shaped end connector portions with essentially the same internal diameter as the through passage of the corrugated body portion of the tubing.

Other objects and advantages relate to certain novel structural and mechanical details of and combinations between certain components of the apparatus, and advantageous and economical process steps, as will become apparent from the following detailed description of preferred methods and procedures, preferred embodiments of the apparatus representing the best known mode of practicing the invention. Such description is made in connection with the accompanying drawings forming a part of the specification.

In the drawings:

FIG. 1 is a foreshortened perspective view of an elongated hollow cylindrical tube support or mandrel suitable for use in the present process;

FIG. 2 is a foreshortened perspective of an uncured rubber tubing blank of conventional type suitable for use in the process;

FIG. 3 is a perspective view, partly in section and with parts broken away and removed, of an helical coil steel spring former suitable for use in the process;

FIG. 4 is a foreshortened perspective view showing an initial stage of the process in which the rubber tubing blank of FIG. 2 is assembled over the mandrel of FIG. 1;

FIG. 5 is an elevational view, foreshortened, showing a succeeding stage of the process in which the spring former of FIG. 3 is assembled over the mandrel and rubber tube blank of FIG. 4 in embracing relation, the helical coil spring former being stretched axially with its convolutions distributed uniformly along the length of the mandrel;

FIG. 6 is a fragmentary elevational detail of the left end of the assembly of FIG. 5, enlarged with respect to that figure and with parts broken away and removed to show the relationships between the several cooperating parts of the apparatus and the rubber tube blank;

FIG. 7 is a foreshortened elevational view, similar to FIG. 5, showing a succeeding step with the tube blank expanded by differential air pressure and confined by the helical coil former which engages the expanded tube along a continuous spiral constriction line;

FIG. 8 is a fragmentary elevational detail of the left end of the assembly of FIG. 7, enlarged with respect to that figure and with parts broken away and removed to show the relationships between the parts;

FIG. 9 is a foreshortened elevational view showing an intermediate stage in the step of axially collapsing the inflated rubber tube blank and the spring former in the development of embryonic corrugations in the blank;

FIG. 10 is a foreshortened elevational view, similar to FIGS. 5, 7 and 9, showing the rubber tube blank and spring former fully collapsed on the mandrel with the spring convolutions interleaved between the corrugations of the rubber tube;

FIG. 11 is an elevational detail of the left end of the assembly of FIG. 10, enlarged with respect to that figure, partly in section and with parts broken away and removed to show the relationships between the parts;

FIG. 11a is a view similar to FIG. 11 showing a modification of the apparatus in which the cylindrical sleeves on the ends of the helical spring wire former are replaced by flat metal rings;

FIG. 12 is a foreshortened elevational view, similar to FIGS. 5, 7 and 10, showing an initial stage in a step of the process which follows that of FIGS. 9 and 10 and in which the rubber tube blank and steel spring former are extended axially after the collapsing step represented by FIG. 9, such extension having the effect of radially contracting the corrugations of the tube blank to permit axial collapsing of the spring former independently of the blank and removal of such former from about the tube blank;

FIG. 13 is a fragmentary elevational detail of the left end of the assembly of FIG. 12, enlarged with respect to that figure, partly in section and with parts broken away and removed, to show the relationships between the parts;

FIG. 14 is a foreshortened elevational view, similar to FIGS. 5, 7, 10 and 12, showing the tube blank following the removal of the steel spring former and, subsequent to such removal, the axial compression of the tube blank, still in the raw or uncured stage, to reform therein the corrugations previously made in the process steps related to FIGS. 5–11;

FIG. 15 is a foreshortened elevational view, partly in section and with parts broken away and removed, showing a number of the raw rubber tube blanks, each with corrugations formed as in the preceding figures by axially collapsing the blanks, assembled together on a common mandrel or support with intervening tubular spacers surrounding the integral cylindrical end connector portions of the blanks, the assembly being ready for heat curing of the formed rubber tube blanks;

FIG. 16 is an elevational view, enlarged with respect to FIGS. 14 and 15, showing an end portion of the spirally corrugated rubber tubing after the cure, with the cured tube removed from the support or mandrel, this view being partly in section with part of the tubing removed to show the contour of the flexible tube wall and the integral cylindrical end connector; and FIG. 17 is a fragmentary elevational detail similar to FIG. 16 showing a spirally corrugated flexible rubber tube made by an optional variation of the process in which the curing by heat is done with the corrugations of the rubber tube somewhat spread out along the support or mandrel instead of being completely collapsed against one another as in FIG. 15 so as to produce a tube with open corrugations, such process variation resulting in the production, from a tube blank of given length, of a tube somewhat longer than the tube of FIG. 16 and of somewhat less flexibility.

According to the process of the present invention, a raw rubber tube blank B, FIG. 2, of uniform section is formed as by extrusion through an auger or tubing machine in the conventional manner and is then treated both internally and externally with a suitable anti-adhesion agent such as soapstone or a silicone solution. The extruded and treated tubing is cut into equal lengths to form blanks used in the process. The operator draws one such blank axially over a support or mandrel 1. This mandrel comprises a metal tube, which may be of steel, of uniform circular cross section and of any convenient length such as from about four to about twenty feet and having a smooth cylindrical external surface of, say, 1½ to 2 inches diameter for making vacuum cleaner hose, larger or smaller diameter for other types of tubing or hose. The mandrel is supported cantilever fashion at one end. The ends of the tubular mandrel are provided with closures 2, 5 comprising steel plugs welded in place. A tubular stem 3 is secured in the plug 5 and provided with an end fitting 9 adapted to mate with a suitable quick detachable fitting on the end of either an air supply line so that air under pressure can be fed into the mandrel interior or a vacuum line so that the mandrel can be evacuated. The tubing blank B is slightly shorter than the mandrel so that end portions of the mandrel project beyond the blank as shown in FIG. 4. The internal diameter of the tube blank B, as formed is the same as or slightly more than the external diameter of the cylindrical mandrel so that the raw rubber tube is about 1/64 inch to about 1/32 inch larger than the diameter of the mandrel. The drawing of the tube blank onto the mandrel is done manually and may be facilitated by introducing air under pressure into the interior of the mandrel, such air being received through line 4 and fitting 29, later described, and escaping through a multiplicity of distributed radial holes 10 drilled in the mandrel and providing a cushion of air between the tube and the mandrel. It is necessary, of course, to introduce an excess of air because some escapes through the exposed holes of the mandrel; care is taken to see that the tube blank is not stretched radially.

After the tubing blank B is received on the mandrel, a spring former 6 is assembled thereover. This former comprises spring metal, preferably a single strip of thin high tensile strength flat steel ribbon bent in its plane to helical shape with adjacent convolutions laid against one another and of the same diameter. The wide dimension of the strip is thus disposed in radial relation to the longitudinal axis of the helical spring former or helix with the edge of the strip normal to such axis. This arrangement obtains maximum strength and resistance against radial deformation with minimum resistance to axial elongation. In its natural shape or condition, to which it tends to revert by inherent resiliency, the former 6 is axially collapsed, as shown in FIG. 3, with adjacent convolutions closely spaced, preferably disposed flatwise against one another in contacting relation, or substantially so. The ends of the spring strip are bent to form grasping or pin receiving eyes or, as shown, are provided with cylindrical handles or sleeves 7, 8 disposed in coaxial relation to the spring. The sleeves 7, 8 are of metal such as steel, heavier than the spring helix 6 and nondeformable in use. Radial end faces one of which is indicated at 32, FIG. 3, on the sleeves are received flatwise against the outsides of endmost turns 31 of the spring helix former and are suitably secured thereto as by welding all around the circumferences of the sleeves.

With the former received over the tubing blank and mandrel, axial forces are applied to the sleeves 7, 8 in opposite directions to stretch the former to the full length of the tube blank B, or substantially so. Metal pins 15, 16 may then be inserted through radial, diametrically aligned holes 11 in the sleeves and through registering holes or sockets 12 provided in the mandrel to hold the former 6 in extended position, if desired. However, use of the pins 15, 16 is not essential and one or both may be eliminated. The helical spring former by reason of its elastic character and because of the loose fit on and about the tube blank B as represented by clearance 33, FIG. 6, between the inner edge 19 and the blank, distributes its convolutions uniformly along the length of the mandrel. Should any of the convolutions of the spring former or helix fail to space themselves evenly along the mandrel because of binding resulting from engagement with the surface of the blank, or otherwise, the operator manually relieves any such binding and adjusts the spring former to obtain uniform spacing of its convolutions, the appearance of the assembly at this stage being shown to advantage in FIGS. 5 and 6.

Thus the internal diameter of the confining spring helix is slightly greater than that of the rubber tube supported on the mandrel so that in stretching the helix over the full length of the supported tube, the spring convolutions move freely without binding on the rubber stock, and yet not so much greater than the tube blank diameter, that in the subsequent inflation the blank is excessively stretched or objectionably distorted before contacting and being confined by the helical former 6. For example, in making vacuum cleaner tubing or hose using the process and apparatus above referred to, it is satisfactory to allow a clearance of from about 1/16 to about 1/4 inch between external surface 13 of the tube blank and inner periphery 19 of the former. The spring former has uniform convolutions which in the unstressed condition of the former are disposed in closely spaced side by side relation and under opposite axial forces applied to the ends of the former distribute themselves uniformly along the embraced tube. It is sufficiently weak and has a resistance to axial elongation sufficiently low to enable the operator or operators easily to stretch it manually to the full length of the supported tube in separating the convolutions to the desired spacing. It is contemplated and within the scope of the invention to use the present process in making corrugated rubber tubing larger in diameter and heavier in section than that referred to and, in such case, the spring helix former will be heavier and larger and suitable power driven mechanism may be employed to stretch it over the tube blank, to effect the subsequent collapsing operation, to separate the tube blank from the former, and to recollapse the tube for the cure. The spacing of the convolutions of the stretched spring former depends upon the desired depth of the corrugations in the completed flexible tubing. For high flexibility deep corrugations are needed and are obtained by widely spacing the convolutions when stretching the helical coil former. For low flexibility shallow corrugations are provided and are obtained by relatively closely spaced convolutions of the former. Thus, for most applications of the process, the space between adjacent convolutions of the former in the stretched condition, as in FIGS. 5–8, is from about one half to about three fourths the diameter of the cylinder defined by the inner periphery 19 of the former; this diameter being, for practical considerations, approximately the diameter of the external surface 13 of the tube blank as supported on the mandrel.

In the case of a relatively short tube blank such as used in making a corrugated tube for diving equipment the operator conveniently and manuallly can hold the spring helix stretched to the desired length without using the pins 15, 16 or either of them and simultaneously can grip the tube blank ends 18 which project axially beyond the sleeves 7, 8 to seal the tube ends against the mandrel; two operators, one at each end of the tube blank, may similarly perform this step of the process on a long tube. Then, as by means of a treadle operated valve, the operator or an assistant introduces pressurized air into the mandrel through a supply line 4 having fitting 29 mating with the mandrel fitting 9. This air inflates the raw rubber tube, distending it outwardly against or into engagement with the confining spring helix former 6. The rubber of the inflated or engaged tube is distended between the convolutions of the wire helix, imparting to the tube blank an incipient or primary corrugated shape shown schematically in FIGS. 7 and 8.

The air is under a pressure of, say, 40–60 pounds per square inch gage from a conventional high volume continuous source, the line fitting 29 being adapted to be quickly, easily and detachably mated to the fitting 9 on the fixed or supported end of the mandrel. At spaced intervals along the mandrel the pressurized air is released through the drill holes 10 of about 1/16 inch diameter into the interior of the tubing blank supported on the mandrel. Although it is not essential to do so, the holes preferably are distributed with a relatively greater number adjacent the fixed end of the mandrel, relatively few or none at and adjacent the outboard end; the reason is that the outboard holes are uncovered during the progressive collapsing of the tube axially, as will appear, and it is desired to minimize air loss through the uncovered holes.

The pressurized air from the mandrel holes 10 inflates the tube blank B, distending it into contact with the inner edge 19 of the confining helical former 6, as shown to advantage in FIGS. 7 and 8. In this connection it is to be observed that the diameter of the clear opening through the former 6 in its distended position is so proportioned in relation to the diameter of the mandrel 1 and the thickness of the blank B as to provide a clearance 20 between internal surface 24 of the inflated tube blank and the external surface of the mandrel 1, such clearance allowing for axial flow of the inflating air between the tube blank B and the mandrel.

The pressure at which the air is introduced into the tubing blank depends upon or is determined by several factors such as the physical characteristics of the rubber compound of which the tubing blank is formed, the thickness of the tubing blank wall, and the spacing between adjacent convolutions of the extended spring former 6. Stiff rubber compounds, thick tubing walls and close spacing of the convolutions of the former spring require higher air pressures than relatively soft rubber compounds, thin tubing walls and wide spacing of the former convolutions. It is satisfactory that the operator determine by visual observation that the exposed portions of the tube blank are bowed outwardly with a radius of curvature (as measured in axial planes) approximately equivalent to the spacing between confronting surfaces 22, 23 of adjacent convolutions of the stretched out former helix. In this inflation of the tubing blank, escape of air out the ends of the tubing is prevented, or at least reduced sufficiently to permit maintenance of proper pressure, by suitably clamping or manually holding the tube ends 18 sealingly against the external surface of the mandrel.

With the tubing blank thus distended and engaged against the continuous inner edge 19 of the helical former 6, and while the internal inflating air pressure is maintained to bow outwardly the tubing blank between convolutions of the former, the retaining pins 15, 16, if used, or one of them are or is then withdrawn and the helical former 6 and the tubing blank B are then progressively collapsed by being axially compressed in unison while supported on and guided by the internal mandrel. In the collapsing operation the operator slides one end of the tube blank toward the other along the mandrel, or both ends toward the middle, the air seals at the tube ends being maintained, or substantially so and the stretched former imparting forces to the distended tube tending to shorten the latter axially and augmenting the axial forces applied manually by the operator. The portions of the tubing blank B exposed between the adjacent convolutions of the former 6 are, by the combination of forces resulting from the simultaneous axial compression and inflation, further bowed outwardly, distended radially and ultimately confined and frictionally held between the parallel confronting surfaces 22, 23 of the former.

While it is generally most convenient to hold one end fast (as by one of the pins 15, 16) while sliding the other end toward it, it is feasible, as indicated above, to slide both ends simultaneously toward one another. In this sliding action there is a progressive conversion of the primary or incipient corrugations shown in FIGS. 7 and 8 into full corrugations which progressively collapse axially against the end which is being moved.

With the tube blank inflated on the forming mandrel and the extended helix disposed thereabout in surrounding relation, the weights of both the rubber and the spring metal helix are carried by the mandrel which thus remains in frictional engagement with the inflated tube blank at points or areas spaced axially along the length of the mandrel corresponding to the spaces between adjacent convolutions of the confining metal helix or spring. Thus an axial load applied to the end of the inflated tube blank is resisted by the frictional forces distributed along the length of the tube with the result that the greatest force being transmitted by the rubber is at or adjacent the end to which the tube collapsing force is applied. Thus the collapsing of the inflated tube occurs progressively as the ends are moved relatively toward one another instead of occurring simultaneously along the entire length of the tube blank. Thus, as the movement of a tube end toward the other end or toward the center occurs, there is a progressive pleating or laying up of corrugations, the laying up progressing spirally and the completed corrugations mutually supporting one another with the wire spring helix confined therebetween and reinforcing or stiffening the rubber tube stock. Since the transformation of the primary corrugations into the complete or collapsed corrugations occurs progressively rather than simultaneously along the entire length of the tube blank, the energy to effect such transformation generally can be applied manually. Moreover, the radial stretching of the rubber tube blank in the completing of the corrugations is aided by the internal air pressure maintained within the tube blank during its axial shortening on the mandrel.

The collapsed, axially compressed tubing blank B is thus provided with a continuous spiral ridge 26 separated by a continuous spiral groove or valley in which is disposed the helical former 6. In the collapsed condition, the clamping of the convolutions of the corrugated tube which comprise the ridge 26 between the parallel confronting faces 22, 23 of the former, retains the tubing blank in the desired spirally corrugated shape without the need for any air or fluid pressure differential between the inside and the outside of the tubing blank. Thus the operator now closes the valve in the air supply line 4 and, if desired, detaches the mandrel fitting 9 from the air line fitting 29.

The preliminary stretching of the spring former over the tube blank and the collapsing operation on the former and the tube blank and also the subsequent stretching of the spring former to remove it from the tube (to be later described) are operations each of which is facilitated by the circular members or sleeves 7, 8 fast on the ends of the spring former 6. These sleeves constitute handles that are readily grasped by the operator or operators. Moreover, each of the sleeves embraces a portion of the tube blank B adjacent and projecting from one end of the corrugated portion and by limiting distention and preventing other distortion of such projecting portion shapes the latter into a cylindrical attaching sleeve which is integral with the corrugated portion of the finished tube.

One or both of the sleeves 7, 8 may be replaced by another form of annular member such as the rigid flat metal ring 14 (FIG. 11a) welded at 17 to the end of the spring former 6 in coaxial relation. The ring 14 has concentric circular inner and outer peripheries and is of heavier section (several times thicker) than the spring former 6 to make it substantially non-deformable in use to prevent distortion and bending. Its inner periphery 21 is substantially equal in diameter to the inner periphery 19 of the spring former and delineates the endmost turn of the groove in the corrugated tube shape by the collapsing operation; its outer periphery 25 is slightly greater in diameter, about ⅛ to about ¼ inch, than the spring former 6, thus providing a convenient hand hold for the operator who can with one hand simultaneously grasp the ring and a projecting portion 27 of the tube blank B to hold the latter sealingly against the mandrel in retaining the inflating air.

After, and, for efficiency in production, this may be and preferably is immediately after, the tube blank B has been collapsed axially as described above, with the confining spring helix former 6 locating and helping to shape the corrugations, the collapsed tube and the former are then drawn out or extended to substantially full length on the mandrel, the rubber tube corrugations, now in embryonic condition, contracting radially and withdrawing from between the convolutions of the former and allowing the latter to collapse axially by inherent resiliency or to be collapsed and be removed from the tube blank off and over the free end of the mandrel. The tube and the spring former 6 are shown schematically partially stretched out or extended in FIGS. 12, 13, it being understood that the embryonic corrugations may take some form other than illustrated. Additional radial contraction of the corrugations of the rubber tube from the shape shown in FIGS. 12 and 13 to permit contraction of the spring former is effected as by further stretching of the tube blank, or by manually squeezing the corrugations against the mandrel, or by both stretching and squeezing. The removal of the spring former may also be facilitated by connecting a vacuum line indicated at 37, FIG. 12, having on its end quick connector fitting 38, to the mandrel fitting 9 and thus reducing the pressure inside the tube blank B so as momentarily to effect radial collapse of the embryonic corrugations of the extended tube by atmospheric pressure sufficiently to allow the spring former to collapse or be collapsed axially and removed.

As a variation or alternative of the process, the tube blank B and the spring former 6, both collapsed axially as shown in FIGS. 10 and 11, are together removed as a unit from the mandrel 1. Then the removed unit, without any internal support for the rubber tube, is stretched out to the original length of the tubing blank, or substantially so. This contracts the tube corrugations radially withdrawing them from between the turns of the spring former and allows the latter to collapse or be collapsed axially and removed. Connection of a vacuum line to one end of the stretched out tube as by inserting it into one of the end portions 18 and manually squeezing the latter about the line, the other end of the stretched tube being suitably sealed as by pinching its walls together manually, the tube having no internal support, results in radial collapse of the tube walls so that the corrugations are drawn inwardly clear of the extended spring former to permit the latter to collapse axially and is a refinement of this spring removal step of the process that can be used to advantage with tubes having deep corrugations.

Immediately upon removal of the former, while the raw rubber tube blank retains its memory of the fully corrugated shape to which it had been distorted in the preceding progressive collapsing corrugating operation and while supported internally on the mandrel 1 or a substitute or curing mandrel, it is again collapsed axially in a recollapsing operation, preferably as by moving one end toward the other or, alternatively, as by moving both ends toward the middle simultaneously; the prior corrugated shape is resumed by the recollapsed tube by reason of the memory referred to.

When the tube blank is recollapsed on the forming mandrel 1 after removal of the spring former 6, or when the tube, after removal from the mandrel with the former 6 as a unit for separation of the latter, is remounted on the mandrel in recollapsed condition, it has the general appearance shown in FIG. 14. The corrugations of the recollapsed tube are laid up flatwise against one another in contacting side by side relation. Suitable means such as hard rubber sleeves are placed about the integral end portions 18 of the tube blank to hold them to the desired shape and such confining sleeves are held by means such as the pins 15, 16, previously referred to for the purpose of restricting the collapsed tube blank to a predetermined axial length on the mandrel during the heat cure to which the tube is then subjected.

Instead of treating as by curing a single tube on the mandrel 1 while holding the tube to the collapsed shape of FIG. 14, it is preferred to mount a plurality of the collapsed tube blanks in end to end relation on a single mandrel which may be the forming mandrel 1 or, desirably, a curing mandrel 40, FIG. 15, which in essential respect is the same as the forming mandrel with the distributed radial holes 10 and the inflation stem 3 omitted. Each of the tube blanks B1, B2 shown in FIG. 15 is made and formed by progressive axial collapsing as described above and, after separation of the spring former used in shaping its corrugations, is either recollapsed axially and then transferred to or threaded onto the curing mandrel 40 or threaded onto such mandrel in extended condition with the recollapsing operation taking place on the curing mandrel 40 or as the tube is threaded onto the latter. The axially collapsed corrugated tube blank or blanks are heat cured in open steam as by pressure treatment conventionally in an autoclave.

Thus a number of tube blanks, each successively formed with the embryonic corrugations as described above are removed one at a time from the forming mandrel and transferred to the curing mandrel 40. In the variation of the process in which the tube blank and the spring former, after the collapsing step which results in the stage shown in FIGS. 10, 11, are removed as a unit from the forming mandrel 6, are separated without internal support for the tube blank, and the tube blank is threaded onto the curing mandrel 40 and collapsed axially, the stage shown in FIG. 14 does not occur with the tube blank collapsed alone on the forming mandrel.

In the progressive axial collapsing of the tube blank and former as shown in FIG. 9, one or both of the locking pins 15, 16 are removed to permit axial movement of the end sleeves 8, 9 of the former relative to the mandrel. FIG. 9 shows the pin 15 alone removed, the collapsing movement being all relatively toward the right hand end where the pin 16 holds the end sleeve 8 in fixed relation to the mandrel 1. However, upon completion of the collapsing operation the removed pin or pins may optionally be replaced for the purpose of holding the tube and the former in collapsed condition temporarily or, as will later appear, for curing without removal from the forming mandrel in accordance with a variation of the process.

To prevent axial deformation of the integral end sleeves 30 and to hold the corrugated portions of the tubes in desired collapsed condition, tubular metal spacing sleeves one of which is shown at 41, FIG. 15, are interposed between the successive tube blanks B1, B2 on the curing mandrel 40. These spacing sleeves are cylindrical in shape and each is larger in internal diameter and sufficiently long to extend over the entire axial lengths of the two connector portions 30 of adjacent tube blanks with clearance 45 between such end connectors. Metal rings 42 welded about their inner peripheries onto the ends of the sleeve 41 are provided to engage supportingly the endmost convolutions of the adjacent rubber tubes, such rings preferably having at least substantially the same radial extent or external diameter as the tubing corrugations being supported thereby.

The endmost tubes on the curing mandrel 40 have their projecting integral cylindrical end connector portions 30 embraced and protected by suitable cylindrical tubular sleeves which may be the same as the sleeves 41 or, as shown at 43, may be similar to the sleeves 41 but only half as long, each being provided with but a single corrugation supporting end flange or ring 42 for engagement against the radial face of the last corrugation on the endmost tube blank. The tubes and spacing sleeves are confined on the mandrel 40 between suitable stop means such as pins 44 removably inserted in transverse relation to the mandrel through holes in the latter.

During the treating or heat curing of the spirally corrugated tube blank while it is held in the axially collapsed condition described, the walls of the corrugations may be held in flatwise contact against one another, objectionable sticking together being prevented by the previously applied anti-adhesion material.

The curing time in the steam chamber depends upon the composition and cross section of the rubber used in the blank B; conventional practice in the rubber extrusion and fabricating industry is followed to provide optimum curing conditions. For synthetic rubbers of the neoprene type a curing time of from about 20 to about 30 minutes in open steam at a temperature of about 296 degrees Fahrenheit is satisfactory but, if necessary, may be varied in accordance with the requirements of any particular condition or set of conditions. The composition and cure are so selected that the physical properties of the cured rubber are as follows for a typical example:

Tensile strength _____ 1400–1500 lbs. per sq. inch.
Elongation _____ 180% to 250%.
Specific gravity _____ 1.4 to 1.5.
Durometer hardness _____ 68 to 72.

During curing, the tube is held to the desired axially collapsed shape and is supported on a mandrel which may be the mandrel 1 on which it was formed or, preferably, a separate mandrel such as indicated at 40, FIG. 15, similar to the mandrel 1 in essentials of construction which may hold several collapsed tubes in end to end relation; the tubes are each provided with suitable means for holding them to the desired collapsed axial length and when several such mandrels are used they are so supported and spaced in the steam heater as to prevent contact between the rubber stock and other tubes or supports during curing.

When the curing of the rubber tube or tubes is completed, the curing mandrel carrying the cured tube or tubes is removed from the steam chamber and the tube or tubes are cooled as by blowing room temperature or cooled air over them by means of a fan. They may also be cooled by spraying with or dipping in room temperature or refrigerated water. Stripped from the mandrel after curing and cooling, each of the completed corrugated tubes has the appearance shown in FIG. 16, the convolutions of the spiral ridge 26 having substantially flat or planar radial side faces 48, 49 with the confronting side faces of adjacent convolutions contacting one another substantially so.

According to a variation of the process, the tubes are cured with the convolutions spread out or separated on the curing mandrel 40 instead of being compacted against one another as shown in FIG. 15. When so spread out, as to a predetermined overall length of the blank established by the operator using suitable index or reference marks on the mandrel to gage the length or by the use of an external gage or measuring member, the side walls of the tube convolutions define an external outwardly opening groove 46 tapered in depth radially and an internal inwardly opening groove 47, also tapered in depth radially, as indicated in FIG. 17 which illustrates a corrugated tube as made by the present process with the corrugations so spread out along the mandrel during the curing step. Thus it is apparent the degree to which the tube is collapsed on the curing mandrel is not critical and it is feasible to make flexible tubes having different external contours, different spacing of corrugations and different degrees of flexibility, all on the same apparatus and all by essentially the same procedural steps, it being necessary merely to alter as desired the extent to which the tube blank with its embryonic corrugations is collapsed and held on the curing mandrel prior to and during the heat curing step.

In making a series of corrugated tubes, each time initially stretching the spring former 6 to the same length in the steps illustrated in FIGS. 5–8, as by the use of a suitable gage or index marks on the mandrel 1, and each time re-collapsing the tube on the curing mandrel 40 to substantially the same length, also by use of suitable gage or index marks on the mandrel, it is feasible to make tubes substantially identical to one another. Such tubes are suitable for commercial uses such as in vacuum cleaners, underwater diving equipment, and agricultural machinery, also as radiator cooling hoses for automobiles and as exhaust tubing for connecting to the outside atmosphere internal combustion engines being operated in enclosed spaces.

The present process includes a convenient feature by which the radial depth of the tube corrugations can be varied. To increase the corrugation depth, the operator relatively increases the length to which the spring former 6 is extended in the step illustrated in FIG. 5. This increases the axial extent of the cylindrical tube blank exposed between adjacent convolutions of the spring former (the blank length-convolution ratio) and which tube blank portion is expanded radially while being shortened axially to form the ridge of the corrugated tube. Conversely, to decrease the corrugation depth the operator relatively decreases the length to which the spring former is extended in the FIG. 5 step.

In accordance with a further variation of the process, the tube blank B is cured without removing the spring former 6. That is, after the progressive axial compression of the tubing blank and the helical coil spring former, described above in connection with FIG. 9, which produces the axially collapsed assembly shown in FIGS. 10 and 11, the tube blank is cured, as in the steam chamber referred to, while it remains on the forming mandrel 1 and while the spring former 6 remains embedded in the helical groove of the rubber tube, the parts being held in place and in predetermined position on and in axial relation to the mandrel by the pins 15, 16 inserted through the end sleeves 7, 8 and the mandrel. If desired, the tube blank and spring former may be removed as a unit from the mandrel 1 after the progressive axial collapsing step has been completed, the removed unit then being threaded onto a curing mandrel such as the mandrel 40, along with other combined tube-former units. The curing of the rubber and the subsequent cooling and stripping of the tube from the mandrel and from the spring former are then accomplished. As in the cases of the previous examples curing is done by subjecting the assembly to pressurized steam in an autoclave or similar steam heater, conventional in the rubber industry. Upon completion of the cure, the assembly of cured tube and spring former is suitably cooled as before by blowing normal room temperature air or cooled air thereover or by immersing in or spraying with water at room temperature or below, such as water received through conventional municipal water supply systems. After cooling, the pins 15, 16 or the pins 44, whichever are used, are withdrawn to unlock the helical former 6 and the mandrel 1 (or 40) so that the latter may be slid axially out of the cured tube or tubes.

With the mandrel removed, each cured rubber tube and its enveloping spring former 6 are, as a unit, extended or stretched axially to original length and the rubber tube is then stripped from the former 6 with which it was collapsed axially in the corrugation shaping operation, being drawn axially out of one end. In the case of thick walled tubes the stripping of the cured or finished tube from the stretched helical former may be facilitated by collapsing the stretched out rubber tube radially as by externally applied pressure or, preferably, by exhausting the interior of the tubing, causing it to be collapsed or partially collapsed radially by atmospheric pressure.

The finished tube, cured with the spring former left in place, has the internal surfaces of the walls of its helical ridge (corresponding to the ridge 26 of the corrugated tube shown in FIG. 16) disposed substantially flatwise against one another in contacting relation; the external surfaces of the ridge (corresponding to the surfaces 48, 49 of the FIG. 16 tube) are disposed in spaced generally parallel relation to one another, having been formed by the oppositely directed parallel surfaces 22, 23 of the spring metal strip comprising the former 6.

As shown in FIG. 11, the side surfaces 22, 23 of the helix former are of substantially the same radial extent as the ridge 26 of the shaped tube blank B. Thus when the steel former is left embedded in the corrugations during the cure it is employed to prevent adjacent portions of the external surface of the tubing blank from contacting one another and sticking together. The internal surfaces of the tubing blank which are in contact during the curing process are prevented from sticking or bonding together as in the principal process described above; that is, a suitable anti-adhesion agent such as a silicone solution or powdered soapstone is applied in a preliminary operation before the tubing blank B is telescoped over the mandrel 1.

The present invention thus provides an improved process of and apparatus for making spirally corrugated rubber tubing quickly and economically. The apparatus is simple to construct and can be cheaply made so that large outlays for capital equipment are not required in order that a rubber goods manufacturer can adopt the invention. Moreover, this invention is suited to mass production methods since the process steps can be conveniently divided between different operators, each specializing and becoming increasingly more proficient in the particular step or series of steps performed.

Formation in the raw rubber tube blank of embryonic corrugations by a combination of forces exerted through differential fluid pressure and by being progressively collapsed axially while the blank is supported internally on the mandrel and while it is restrained externally against distention along a continuous helical line by the spring former, provides an intermediate product comprising a raw rubber tube blank in which the embryonic corrugations can be readily reformed by axially recollapsing the blank while it is suitably supported internally as on an elongated mandrel.

In accordance with the patent statutes the principles of the present invention may be utilized in various ways, numerous modifications and alterations being contemplated, substitution of parts and changes in construction of the apparatus being resorted to as desired, it being understood that the apparatuses shown in the drawings and described above and the particular methods and process steps set forth are given merely for purposes of explanation and illustration of the best known mode of practising and using the invention without intending to limit the scope of the claims to the specific details disclosed.

What we claim and desire to secure by Letters Patent of the United States is:

1. The process of making a corrugated rubber tube which comprises supporting an elongated raw rubber tube blank in substantially cylindrical form,
   positioning about and in circumferentially confining relation to the supported tube a resilient helical coil former,
   axially stretching the former, to space its convolutions axially along the supported tube,
   distending the tube radially and engaging and assembling it with the stretched former to provide an elongated assembly of the tube and the former in which portions of the tube located between adjacent convolutions of the former are bowed outwardly and constitute embryonic corrugations and in which tension in the stretched former imparts axial forces to the distended tube and tends to shorten the assembly axially,
   augmenting said forces by an axial thrust applied to at least one end of the distended and engaged tube to axially and progressively collapse the assembled tube and former simultaneously and in unison while they are supported on the mandrel to develop said embryonic corrugations into full corrugations located between the convolutions of the helical coil former,
   axially extending the collapsed tube to withdraw its corrugations from between the convolutions of the former, separating the former from the tube, recollapsing and reforming the corrugations in the tube and treating the recollapsed tube to set the corrugations.

2. The tube making process as claimed in claim 1 which includes the step of applying differential fluid pressure to and contracting the tube radially prior to the separating of the former.

3. The tube making process as claimed in claim 1 in which the tube is collapsed to one axial length in developing the full corrugations and, in reforming the corrugations, the tube is recollapsed to another axial length greater than said one length.

4. The process of making a corrugated rubber tube comprising the steps of drawing a raw rubber tube blank of uniform section axially onto and supporting it in contacting relation on an internal mandrel,
   axially stretching a resilient helical former over the tube with clearance between the supported tube and the stretched former,
   distributing the convolutions of the spiral former along the length of the tube by the internal forces in the stretched former,
   subjecting the tube to differential fluid pressure while it and the former are supported respectively directly and indirectly by the mandrel to form the tube into a distended tube and bring its external surface strongly into frictional engagement with the convolutions of the distributed former along a continuous contact line extending spirally about the distended tube from end to end of the former with those portions of the tube located between the former convolutions bulging outwardly and comprising a rounded crest also extending spirally from end to end of the former and located between the convolutions of the contact line and providing an interlock to resist axial shifting of the former relative to the tube and with said internal forces tending to shorten the distended tube axially,
   augmenting said internal forces by an axial thrust applied to at least one end of the distended and engaged tube to effect a simultaneous axial collapsing of both the distended tube and the former while they are both so supported on the mandrel, said collapsing commencing at one and continuing progressively toward the other end of the former with the collapsing moving spirally along said crest which by resolution of forces in the tube is progressively increased in radius about the longitudinal axis of the tube while concurrently the axial extent of the crest is progressively reduced to shape the corrugations, and then treating the corrugated tube to set permanently the corrugations.

5. In the tube making process of claim 4, the steps of axially extending both the tube and the former, after said axial collapsing and before the treating, substantially to their axial lengths prior to said axial collapsing, then separating the former from the tube, and then axially recollapsing the tube to reform the corrugations.

6. In the tube making process of claim 5, reversing the differential fluid pressure before separating the former from the tube to contract the tube corrugations and withdraw them radially from between the convolutions of the former.

7. In the tube making process of claim 5, performing the step of axially extending both the tube and the former while they remain on and the tube is internally supported by the mandrel.

8. In the tube making process of claim 7, performing the step of axially recollapsing the tube while the tube remains on and is internally supported by the mandrel.

References Cited in the file of this patent

UNITED STATES PATENTS

| | | |
|---|---|---|
| 1,271,455 | Fitts | July 2, 1918 |
| 2,099,843 | Connell | Nov. 23, 1937 |
| 2,272,704 | Harding | Feb. 10, 1942 |
| 2,299,520 | Yant | Oct. 20, 1942 |
| 2,347,101 | Harding | Apr. 18, 1944 |
| 2,616,129 | Burton et al. | Nov. 4, 1952 |
| 2,712,157 | Holte | July 5, 1955 |
| 2,743,759 | Snow et al. | May 1, 1956 |
| 2,797,730 | Martin | July 2, 1957 |
| 2,833,330 | Love | May 6, 1958 |
| 2,866,230 | Holte | Dec. 30, 1958 |
| 2,903,744 | Harrison et al. | Sept. 15, 1959 |

FOREIGN PATENTS

| | | |
|---|---|---|
| 145,612 | Great Britain | 1922 |
| 350,390 | Great Britain | May 27, 1931 |